United States Patent
Chida et al.

(10) Patent No.: US 7,548,811 B2
(45) Date of Patent: Jun. 16, 2009

(54) CONTROL APPARATUS OF VEHICLE INCORPORATING AUTOMATIC TRANSMISSION

(75) Inventors: Ryuji Chida, Toyota (JP); Kenji Matsuo, Toyota (JP); Hirofumi Nakada, Toyota (JP); Tomokazu Inagawa, Toyota (JP); Kazuaki Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 788 days.

(21) Appl. No.: 11/175,317

(22) Filed: Jul. 7, 2005

(65) Prior Publication Data

US 2006/0041362 A1    Feb. 23, 2006

(30) Foreign Application Priority Data

Aug. 4, 2004    (JP)    ............................. 2004-227912

(51) Int. Cl.
G06F 17/00    (2006.01)
(52) U.S. Cl. ............................. 701/51; 701/54; 701/60; 701/65; 477/98
(58) Field of Classification Search ............. 701/51–56, 701/60, 65; 477/34, 37, 98
See application file for complete search history.

(56) References Cited

U.S. PATENT DOCUMENTS

| 6,068,029 A | 5/2000 | Toussagnon et al. |
| 6,631,318 B2 * | 10/2003 | Kamiya et al. ................. 701/51 |
| 7,072,762 B2 * | 7/2006 | Minami et al. .............. 701/123 |
| 7,433,770 B2 * | 10/2008 | Inagawa et al. ................ 701/51 |

FOREIGN PATENT DOCUMENTS

| JP | 0 589 507 A2 | 3/1994 |
| JP | A 11-325235 | 11/1999 |
| JP | A 2005-042787 | 2/2005 |

\* cited by examiner

*Primary Examiner*—Richard M. Camby
(74) *Attorney, Agent, or Firm*—Oliff & Berridge, PLC

(57) ABSTRACT

An ECU executes a program including the steps of, when an oil level adjustment mode is attained, executing control of the engine speed if an AT oil temperature is higher than an oil temperature threshold value T(1), turning on a "D" lamp of an indicator if the AT oil temperature is higher than an oil temperature threshold value T(2) and the AT temperature is lower than an oil temperature threshold value T(3), flashing the "D" lamp of the indicator if the AT oil temperature is higher than the oil threshold value T(3), and executing normal engine speed control if the AT oil temperature is higher than an oil temperature threshold value T(4).

10 Claims, 3 Drawing Sheets

CONTROL APPARATUS OF VEHICLE INCORPORATING AUTOMATIC TRANSMISSION

This nonprovisional application is based on Japanese Patent Application No. 2004-227912 filed with the Japan Patent Office on Aug. 4, 2004, the entire contents of which are hereby incorporated by reference.

BACKGROUND OF THE INVENTION

1. Field of the Invention

The present invention relates to a control apparatus of a vehicle, and particularly, to a technique for controlling an internal combustion engine of a vehicle when adjusting an amount of hydraulic fluid of an automatic transmission in the vehicle incorporating the automatic transmission.

2. Description of the Background Art

Among automobiles, particularly many passenger cars employ an automatic transmission (AT) as a transmission. The automatic transmission is constituted by a torque converter and a transmission mechanism (irrespective of whether it is a stepped transmission using gears or the like or a continuously variable transmission using a belt of the like), wherein the torque converter and the transmission mechanism are filled with a hydraulic fluid (oil). If the amount of oil is less than a determined amount, an oil pump may not be able to intake the oil and may intake air instead when cornering or when going up a hill at a low temperature, whereby the driving force may be reduced.

On the other hand, with an excessive amount of oil, if the oil level is raised by expansion when, for example, the oil is at a high temperature, the oil is agitated by a rotary member such as a clutch drum of a gear type transmission mechanism. This increases the mechanical loss and further raises the oil temperature. Thus, the durability of the automatic transmission may be deteriorated and oil blow out from a breather may be incurred. Accordingly, the amount of oil must be constantly maintained properly.

Since the oil of an automatic transmission has its viscosity changed in accordance with its temperature, and the oil level changes by expansion, the adjustment to a proper amount should preferably be performed fixing the oil temperature condition. Normally, the oil is often managed at the level corresponding to 158-176° F., which is a temperature range that can be attained by a general driving of a vehicle and in which the circulation of oil is easier to be stabilized. It is difficult to increase the oil temperature to such degrees at an automobile manufacturing factory in relation to the number of steps, and therefore a check level is separately set for management that corresponds to an oil temperature obtained by measurement after an inspection step.

Thus, although it requires some steps, the oil level can thoroughly be managed at a manufacturing factory. However, as the oil deteriorates with age, an oil change is also done at a dealer when the vehicle is used over a long period. In this case, as means for precisely obtaining the oil temperature is not available, the automobile is actually driven and the internal temperature of the transmission is waited for to rise, and then the oil level is managed.

An actual method therefor is performed by driving the vehicle under a prescribed condition, for example for 30 minutes at 38 mile per hour, and thereafter checking the amount of oil. Driving the vehicle under this condition, the internal temperature of the transmission is stabilized to about 158-176° F. Thus, the oil can be supplied under the condition of an actual usage. However, such a method requires a course for driving the vehicle, as well as many steps.

Japanese Patent Laying-Open No. 11-325235 discloses an oil level detection and display method for an automatic transmission, for easily supplying a proper amount of oil when supplying the oil to an automobile incorporating such an automatic transmission. The oil level detection and display method for an automatic transmission is a method, in an automobile incorporating a failure diagnosis system in an AT controller, for causing the AT controller to generate a display output indicative of oil level detection conditions of an automatic transmission are all satisfied, wherein, as the oil level detection conditions of an automatic transmission, at least an engine is running at an idling speed, the vehicle is parking, and a speed change selection lever is in N range or P range position.

According to the oil level detection and display method for an automatic transmission, when short-circuiting a diagnosis terminal of the AT controller, different display is presented between when it is appropriate to detect the oil level of the automatic transmission and when it is not. In this case, if the engine is running at the idling speed and the vehicle is parking, then the oil is distributed over the necessary portions and stabilized. Thus, the oil can also be supplied in a proper amount when an oil change is done at a dealer or the like where a course for actually driving the vehicle is not available.

However, the oil level detection conditions in the oil level detection and display method for an automatic transmission disclosed in Japanese Patent Laying-Open No. 11-325235 only require that an engine is running at an idling speed, that the vehicle is parking, and that a speed change selection lever is in N range or P range position. The engine speed may not be constant even when idling, depending on the effect of auxiliary equipment actuated by revolution of the engine. If the engine speed changes in such a state, an amount of oil sticking inside (when the hydraulic fluid is low in temperature and high in viscosity, it sticks to a housing or the like in the transmission mechanism and would not return to an oil pan) and/or a hydraulic fluid temperature do not attain desirable values. Accordingly, the oil level fluctuates and precise adjustment of the oil level is difficult.

SUMMARY OF THE INVENTION

The present invention has been made to solve the aforementioned problems, and an object thereof is to provide a control apparatus of a vehicle incorporating an automatic transmission.

A control apparatus according to the present invention controls an internal combustion engine in order to support a metering work of a hydraulic fluid of an automatic transmission transmitting an output of the internal combustion engine to driving wheels. The control apparatus includes a sensing unit sensing a temperature of the hydraulic fluid of the automatic transmission, an output unit outputting information indicating that a state suitable for the metering work is attained, based on the temperature of the hydraulic fluid, and a control unit controlling a speed of the internal combustion engine so that the temperature of the hydraulic fluid attains a predetermined temperature.

According to the present invention, if an operator executes a special operation (which is not executed when normally driving, and which is done using a shift lever) at a dealer or the like, a metering mode for adjusting an amount of hydraulic fluid of an automatic transmission is entered. The metering mode is realized in a state where an internal combustion engine is kept to be actuated (and while the vehicle is parking). A pump for circulating the hydraulic fluid of the automatic transmission is being actuated, and the hydraulic fluid is circulating in the automatic transmission. Since the hydraulic fluid greatly changes its behavior depending on its viscosity, and the viscosity is dependent on temperature, the temperature of the hydraulic fluid suitable for the metering work is set in advance. The speed of an internal combustion engine is controlled (for example, to maintain the speed) when the temperature is attained. Thus, the internal combustion engine can be controlled so that the hydraulic fluid of the automatic transmission attains a state suitable for the metering work. Thus, the internal combustion engine is controlled, and when the temperature suitable for metering is reached, information indicative of the state suitable for the metering work is attained is output by an output unit, so that the operator can recognize. The operator meters the hydraulic fluid of the automatic transmission based on the output information. As a result, the control apparatus of a vehicle incorporating an automatic transmission that is capable of precisely adjusting the oil level of the automatic transmission can be provided.

Preferably, the control unit controls the speed of the internal combustion engine so that the speed is maintained, when the temperature of the hydraulic fluid attains a predetermined temperature.

According to the present invention, the speed of the internal combustion engine is maintained when the temperature of the hydraulic fluid attains the temperature not higher or lower than the temperature suitable for the metering work, so that the temperature can be maintained.

Further preferably, the control unit controls the speed of the internal combustion engine so that the temperature of the hydraulic fluid is in a predetermined temperature range.

According to the present invention, the speed of the internal combustion engine is maintained when the temperature of the hydraulic fluid attains the temperature range not higher or lower than the temperature suitable for the metering work, so that the temperature range can be maintained.

Further preferably, the predetermined temperature is a temperature suitable for the metering work of the hydraulic fluid of the automatic transmission.

According to the present invention, as an operator can perform a metering work when the hydraulic fluid of an automatic transmission is at the temperature suitable for the metering work, the oil level of the automatic transmission can precisely be adjusted, and a control apparatus of a vehicle incorporating an automatic transmission can be provided. Additionally, as information (information indicating that the state suitable for the metering work is attained) is output so that the operator can recognize, the operator can start the work immediately after the state suitable for the metering work is attained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
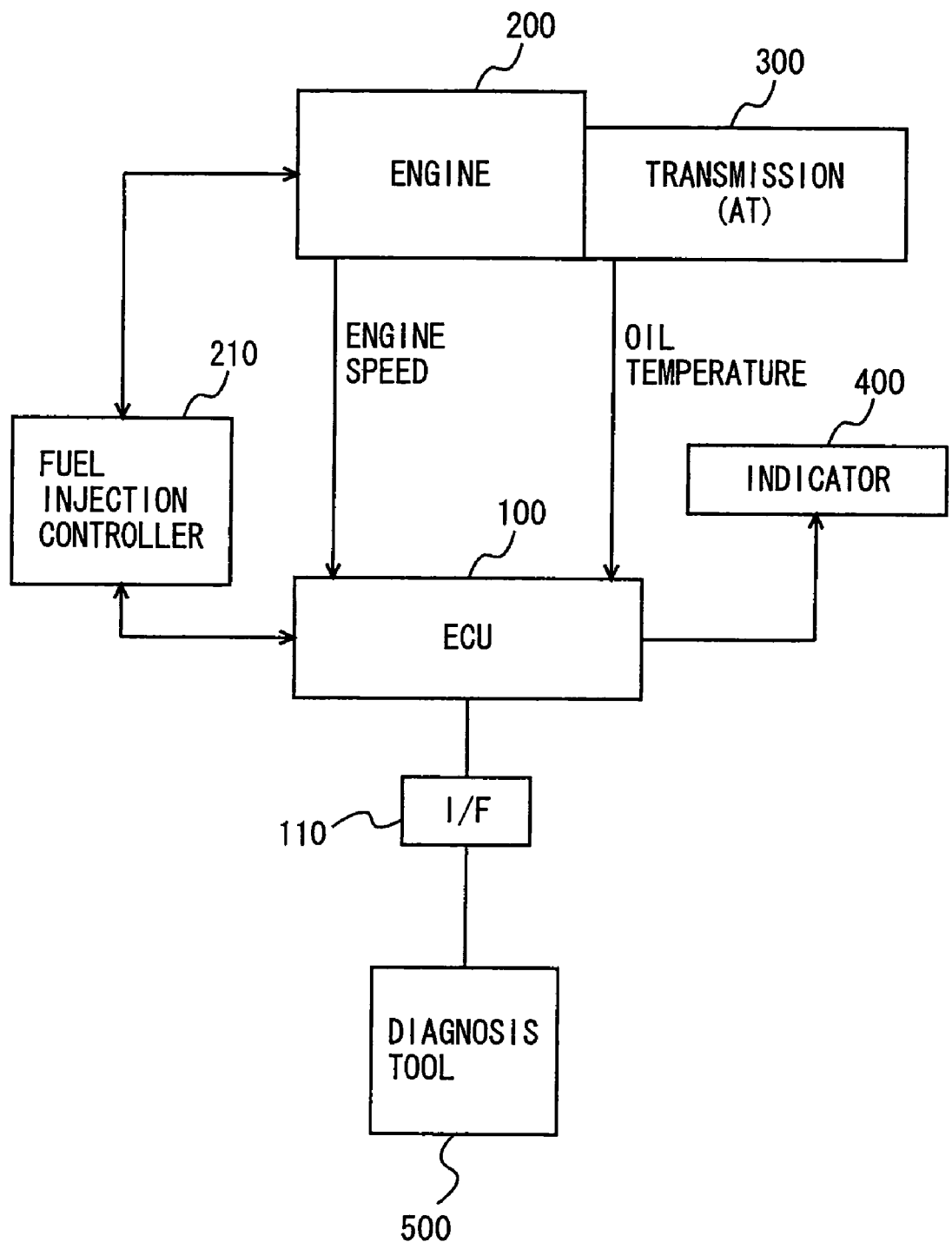
FIG. 1 is a control block diagram of a power train including an ECU that is a control apparatus of a vehicle according to an embodiment of the present invention.

In the following, referring to the drawings, an embodiment of the present invention is described. In the following description, identical components are denoted by an identical reference character. Their name and function are also identical. Accordingly, detailed description thereof is not repeated.

Referring to FIG. 1, a control block diagram of a power train controlled by an ECU (Electronic Control Unit) that is a control apparatus according to the present embodiment is described.

The control apparatus according to the present embodiment is implemented by an ECU 100 shown in FIG. 1. ECU 100 solely embodies two functions of an engine ECU and an ECT (Electronically Controlled Automatic Transmission)_ ECU. ECU 100 mainly controls an engine 200 and a transmission (AT) 300 connected to an output shaft of engine 200.

Engine 200 may be a known petrol or diesel engine, and it is not specifically limited. Transmission 300 may be an automatic transmission that uses a hydraulic fluid (oil), and it may be a stepped transmission such as a gear type, or it may be a continuously variable transmission such as a belt type.

ECU 100 controls the speed of engine 200 through a fuel injection controller 210. From engine 200, a signal indicative of an engine speed is output to ECU 100. From transmission 300, a signal indicative of an AT oil temperature is output to ECU 100. ECU 100 outputs data for displaying on an indicator 400 information notifying an operator that a metering work of the oil of transmission 300 is appropriate to perform. Indicator 400 is a position lamp of the automatic transmission provided to an instrumental panel, for example. It may be an oil warning lamp.

ECU 100 is connected to a diagnosis tool 500 through I/F (Interface) 110. I/F 110 has a connector shape formed by male and female connectors. By short-circuiting a particular terminal of the connector on ECU 100 side, ECU 100 can recognize it as a special work mode. Failure diagnosis tool 500 is for example an information display apparatus for an operator having a liquid crystal panel, for example.

Transmission 300 is constituted by a torque converter and a transmission mechanism, and an oil pump is provided between the torque converter and the transmission mechanism. The oil pump is a non-crescent type oil pump, for example, and driven by the revolution of the engine.

The oil of the automatic transmission driven by the oil pump is accumulated by a prescribed amount in an oil pan provided below a transmission case, and circulates in the transmission case by the oil pump. Transmission case is provided with a refill plug used for charging the oil of the automatic transmission, and the oil pan is provided with an overflow plug for discharging an excessive oil. The overflow plug is provided with an overflow tube. When the oil is accumulated in the oil pan over the prescribed amount, the surface thereof becomes higher than the overflow tube, and the redundant oil of the automatic transmission is discharged from the overflow plug through the overflow tube. When the oil of the automatic transmission is insufficient, oil is supplied from the refill plug. The overflow plug is opened, and oil is introduced from a refill port until the oil comes out of the overflow plug. It is noted that the metering of the oil of the automatic transmission is not limited to such a method.

Figure 2:
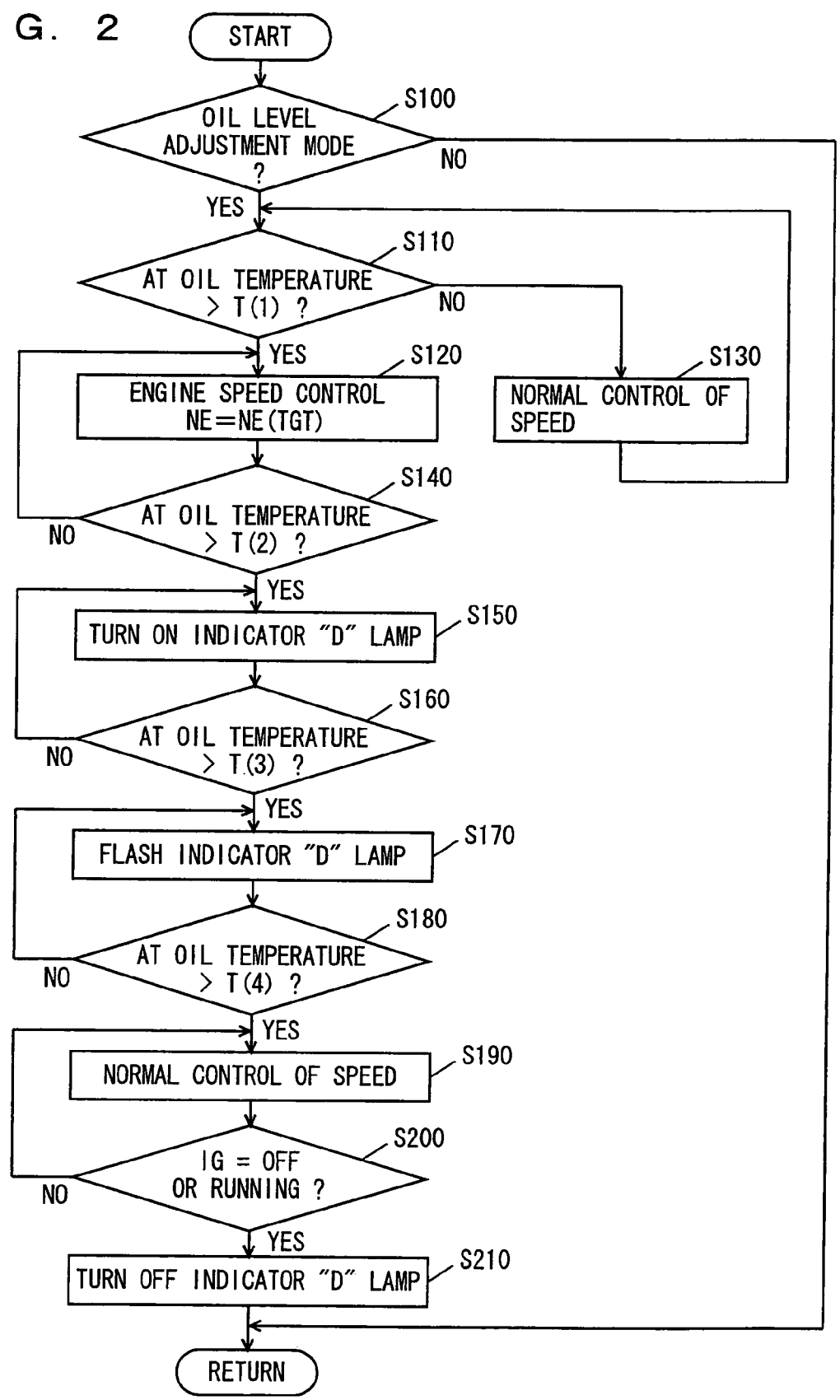
FIG. 2 is a flowchart showing a control configuration of a program executed at the ECU in FIG. 1.

Referring to FIG. 2, a control configuration of a program executed by ECU 100 that is a control apparatus according to the present embodiment is described. The oil temperature threshold values in the following description satisfy the following relationship: $T(1)<T(2)<T(3)<T(4)$.

At step (hereinafter step is abbreviated as S) 100, ECU 100 determines whether it is an oil level adjustment mode or not. The oil level adjustment mode is a mode adjusting an amount of oil of transmission 300, and executed in a state where the vehicle is parking and the engine is actuated. Whether it is the oil level adjustment mode or not is determined by, for example, performing an operation of shifting the shift lever from N position to D position and then returning from D position to N position within 1.5 seconds and repeating it continuously for at least six seconds, while short-circuiting a particular terminal of I/F 110 on ECU 100 side. If it is the oil level adjustment mode (YES at S100), then the process goes to S110. Otherwise (NO at S100), the process ends.

At S110, ECU 100 determines whether the AT oil temperature is higher than predetermined oil temperature threshold value T(1) or not. If the AT oil temperature>T(1) (YES at S110), then the process goes to S120. Otherwise (NO at S110), the process goes to S130. Oil temperature threshold value T(1) is set corresponding to the oil temperature for initiating control of the speed of engine the oil level.

At S120, ECU 100 provides engine speed control. Here, a target value of engine speed NE is set to NE(TGT). At S130, ECU 100 provides normal engine speed control. For example, here, by ISC (Idle Speed Control), the speed of engine 200 is controlled to the speed of the idling state. After S130, the process goes back to S110.

At S140, ECU 100 determines whether the AT oil temperature is higher than predetermined oil temperature threshold value T(2) or not. If the AT oil temperature>T(2) (YES at S140), then the process goes to S150. Otherwise (NO at S140), the process goes back to S120. Oil temperature threshold value T(2) is set corresponding to the lower limit of the oil temperature appropriate for adjusting the oil level.

At S150, ECU 100 turns on a "D" lamp of indicator 400.

At S160, ECU 100 determines whether the AT oil temperature is higher than predetermined oil temperature threshold value T(3) or not. If the AT oil temperature>T(3) (YES at S160), then the process goes to S170. Otherwise (NO at S160), the process goes back to S150. Oil temperature threshold value T(3) is set corresponding to the upper limit of the oil temperature appropriate for adjusting the oil level.

At S170, ECU 100 flashes the "D" lamp of indicator 400.

At S180, ECU 100 determines whether the AT oil temperature is higher than predetermined oil temperature threshold value T(4) or not. If the AT oil temperature>T(4) (YES at S180), then the process goes to S190. Otherwise (NO at S180), the process goes back to S170. Oil temperature threshold value T(4) is set corresponding to the oil temperature for finishing the control of engine speed.

At S190, ECU 100 executes normal control of engine speed. The control here is the same as the aforementioned process at S130.

At S200, ECU 100 determines whether an ignition is turned off or the vehicle is in a running state or not. If the ignition is turned off or the vehicle is in a running state (YES at S200), the process goes to S210. Otherwise (NO at S200), the process goes back to S190.

At S210, ECU 100 turns off the "D" lamp of indicator 400.

An operation in relation to an oil metering work of transmission 300 of a power train controlled by ECU 100, which is a control apparatus according to the present embodiment, based on the aforementioned structure and flowchart is described.

By an operation of an operator, short-circuiting a specific terminal of I/F 110 on ECU 100 side and shifting the shift lever from N position to D position and then shifting it from D position to N position within 1.5 seconds and repeating it continuously for at least six seconds, the oil level adjustment mode is determined (YES at S100). Based on information indicative of the oil temperature input to ECU 100 from the oil temperature sensor provided to transmission 300, when the AT oil temperature is lower than oil temperature threshold value T(1) (NO at S110), normal control of engine speed is executed.

While such normal control of speed of engine 200 is executed, the AT oil temperature gradually increases. When the AT oil temperature becomes higher than oil temperature threshold value T(1) (YES at S110), control of engine speed is executed with the target value of NE(TGT) (S120). When the AT oil temperature becomes higher than oil temperature threshold value T(2) (YES at S140), the "D" lamp of the indicator turns on (S150). When this indicator "D" lamp turns on, the operator can recognize that the AT oil temperature has reached the temperature suitable for the metering work. Thus, the operator loosens the overflow plug of the oil pan provided below the transmission case so that the redundant oil of the automatic transmission is discharged from the overflow plug. If no oil is discharged when the overflow plug is opened, it is determined that the amount of oil is small. Then, the refill plug is opened and the oil of the automatic transmission is supplied from the refill port until the oil comes out from the overflow plug. During such a work also, engine 200 is controlled by ECU 100 to have the engine speed of NE(TGT).

On the other hand, when the AT oil temperature continues to rise and becomes higher than oil temperature threshold value T(3) (YES at S160), the indicator "D" lamp flashes (S170). As this oil temperature threshold value T(3) is the upper limit value of the temperature suitable for oil level adjustment, the operator ends the adjustment work of the amount of oil of the automatic transmission when the "D" lamp of the indicator flashes (S170).

When the AT oil temperature further rises and becomes higher than oil temperature threshold value T(4) (YES at S180), the control of suppressing the increase in the engine oil temperature by setting the engine speed to be target engine speed NE(TGT) is finished, and normal control of engine speed is executed (S190).

Such an operation is performed until the ignition switch is turned off or the vehicle runs. When the ignition switch is turned off or the vehicle runs (YES at S200), the "D" lamp of indicator 400 turns off (S210).

Figure 3:
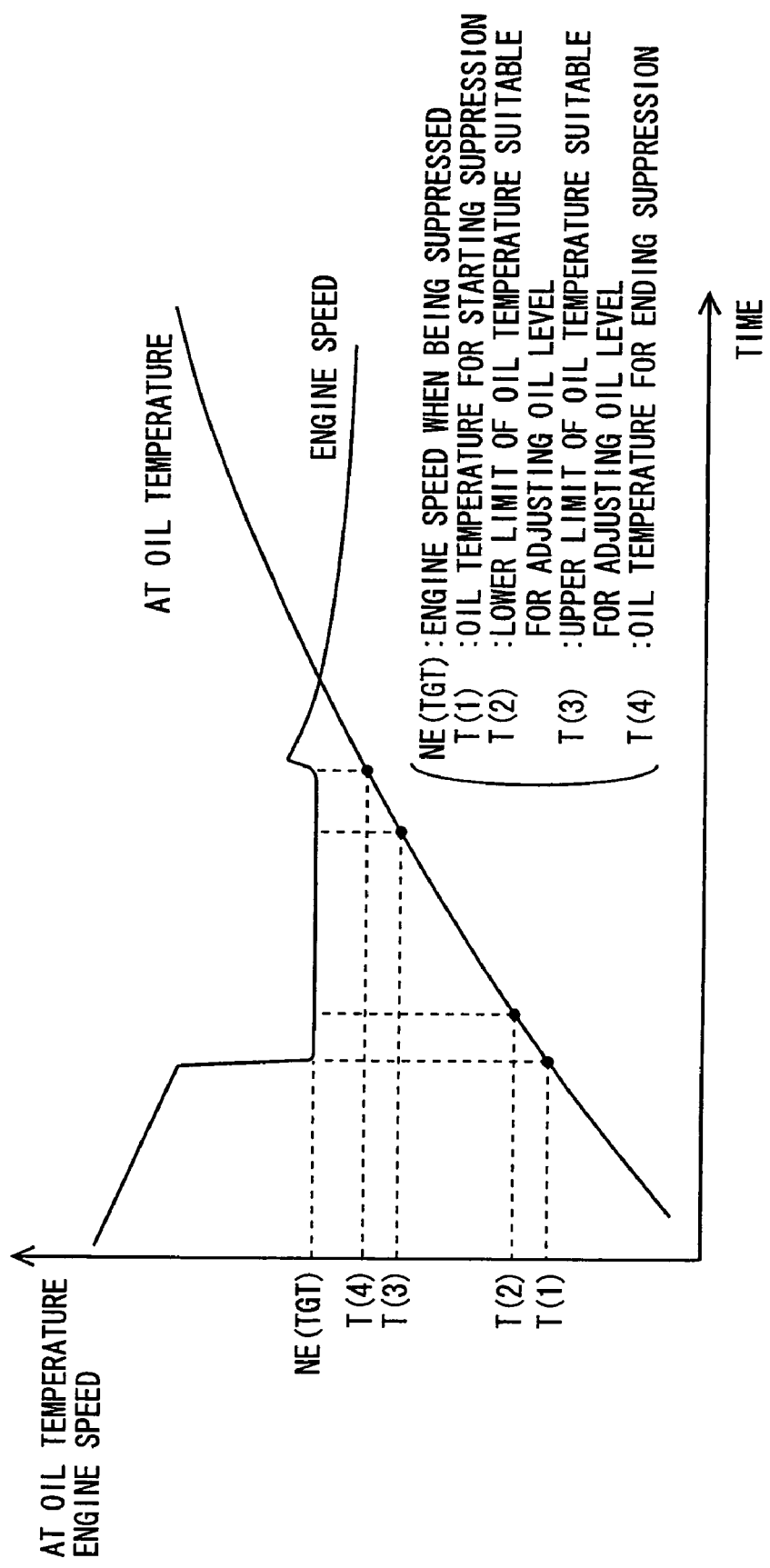
FIG. 3 shows variations over time of the oil temperature of an automatic transmission and the engine speed.

Referring to FIG. 3, variations over time of the oil temperature of an automatic transmission and the engine speed are described. It is assumed that initially the oil temperature is low and the engine speed is high.

When the AT oil temperature gradually rises and reaches oil temperature threshold value T(1), the engine speed has its target speed set to NE(TGT). When the AT oil temperature gradually rises and reaches oil temperature threshold value T(2), the indicator "D" lamp turns on. This state continues until the AT oil temperature reaches T(3). When the AT oil temperature becomes higher than T(3), the "D" lamp of indicator 400 flashes. When the AT oil temperature becomes higher than oil temperature threshold value T(4), the control of engine speed is returned to normal control of speed. When the ignition is turned off or the vehicle is in the running state, the "D" lamp of indicator 400 turns off. The "D" lamp, which notifies the operator that the oil metering work is appropriate, turns on when the AT oil temperature is in the range of T(2)-T(3).

Thus, while the engine is controlled by the ECU according to the present embodiment and the oil temperature of the automatic transmission that is a transmission is maintained at the suitable temperature (suitable for the metering work), information that the metering work is suitable is displayed on the indicator. Here, as the operator performs the metering operation based on the contents displayed on the indicator, the amount of oil of the automatic transmission can be adjusted in the state suitable for the metering operation.

In the foregoing description, while the "D" lamp of indicator 400 turns on, flashes, and turns off, diagnosis tool 500 connected through I/F 110 may display equivalent information in place of such operations.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for controlling an internal combustion engine in order to support a metering work of a hydraulic fluid of an automatic transmission transmitting an output of the internal combustion engine to driving wheels, comprising:
   a sensing unit sensing a temperature of the hydraulic fluid of said automatic transmission;
   an output unit outputting information indicating that a state suitable for said metering work is attained, based on said temperature of the hydraulic fluid; and
   a control unit controlling a speed of said internal combustion engine so that said temperature of the hydraulic fluid attains a predetermined temperature
   wherein said control unit controls said speed of said internal combustion engine so that said speed is maintained, when said temperature of the hydraulic fluid attains a predetermined temperature.

2. The control apparatus according to claim 1, wherein said control unit controls said speed of said internal combustion engine so that said temperature of the hydraulic fluid is in a predetermine temperature range.

3. The control apparatus according to claim 1, wherein said predetermined temperature is a temperature suitable for the metering work of the hydraulic fluid of said automatic transmission.

4. A control apparatus for controlling an internal combustion engine in order to support a metering work of a hydraulic fluid of an automatic transmission transmitting an output of the internal combustion engine to driving wheels, comprising:
   sensing means for sensing a temperature of the hydraulic fluid of said automatic transmission;
   output means for outputting information indicating that a state suitable for said metering work is attained, based on said temperature of the hydraulic fluid; and
   control means for controlling a speed of said internal combustion engine so that said temperature of the hydraulic fluid attains a predetermined temperature,
   wherein said control means includes means for controlling said speed of said internal combustion engine so that said speed is maintained, when said temperature of the hydraulic fluid attains a predetermined temperature.

5. The control apparatus according to claim 4, wherein said control means includes means for controlling the speed of said internal combustion engine so that said temperature of the hydraulic fluid is in a predetermined temperature range.

6. The control apparatus according to claim 4, wherein said predetermined temperature is a temperature suitable for the metering work of the hydraulic fluid of said automatic transmission.

7. The control apparatus according to claim 1, wherein said predetermined temperature is a temperature suitable for the metering work of the hydraulic fluid of said automatic transmission.

8. The control apparatus according to claim 2, wherein said predetermined temperature is a temperature suitable for the metering work of the hydraulic fluid of said automatic transmission.

9. The control apparatus according to claim 4, wherein said predetermined temperature is a temperature suitable for the metering work of the hydraulic fluid of said automatic transmission.

10. The control apparatus according to claim 5, wherein said predetermined temperature is a temperature suitable for the metering work of the hydraulic fluid of said automatic transmission.

* * * * *